United States Patent Office 3,629,373
Patented Dec. 21, 1971

3,629,373
MASTICATION OF 2-ALKYL BUTADIENE-1,3-
ACRYLIC NITRILE COPOLYMER
William H. Embree, Sarnia, Ontario, Canada, assignor to
Polymer Corporation Limited, Sarnia, Ontario, Canada
No Drawing. Continuation of application Ser. No.
584,971, Oct. 7, 1966. This application Oct. 14,
1969, Ser. No. 871,737
Int. Cl. C08d 5/00
U.S. Cl. 260—894  9 Claims

ABSTRACT OF THE DISCLOSURE

Vulcanizable compositions of improved processability are obtained by masticating a high molecular weight copolymer of an alkadiene and an acrylic nitrile at a temperature of from 50 to 200° C. to reduce the Mooney viscosity from at least 40 to a value below 20.

---

This application is a continuation of S.N. 584,971, filed Oct. 7, 1966, now abandoned.

This invention relates to synthetic rubber compositions having improved processability. More particularly it relates to a process of preparing such compositions using a copolymer of a 2-alkyl butadiene and an acrylic nitrile.

In preparing a rubber composition for vulcanization into a useful article, the raw rubber is masticated on a mechanical mixer such as open two-roll mill or an internal mixer to soften it to a degree where incorporation of compounding ingredients is facilitated. With natural rubber and styrene-butadiene rubber this softening action may be aided by the use of chemical plasticizers known as peptizers, in that prolonged mastication is avoided. However in the case of nitrile rubber such as butadiene-1,3, acrylonitrile copolymer, peptizers are not as effective as in natural and styrene-butadiene rubbers and raising the temperature during mastication above 100° C. has an adverse effect on softening due to the tendency of nitrile rubber to gel.

It is an object of this invention to provide nitrile rubber compositions having improved processability. Another object is the provision of a process for preparing such nitrile compositions. Still a further object of the invention is to provide rubber articles based on vulcanized nitrile rubber having improved processability.

The present invention is based on the discovery that, when butadiene-1,3 in nitrile rubber is replaced by a 2-alkyl butadiene-1,3 such as isoprene, a rubbery poymer is obtained which in contrast to commercial nitrile rubber is easily softened by mastication. Further surprising element of the invention is that the elastomeric copolymer of e.g. isoprene and acrylonitrile which has been softened to an almost liquid state can be vulcanized to a soft rubber characterized by satisfactory physical properties. Until now it has not been possible to satisfactorily cure the liquid nitrile polymer to a rubbery state.

According to the present invention, a process is provided of preparing a vulcanizable composition of improved processability which process comprises masticating a high molecular weight elastomeric copolymer of 2-alkyl butadiene-1,3 and an acrylic nitrile to produce an essentially gel-free copolymer having a Mooney viscosity ML 1+4(100° C.) below about 20.

In one of the specific aspects, the invention provides a process of preparing a vulcanizable composition of improved processability which process comprises (1) masticating a high molecular weight copolymer of isoprene and acrylonitrile containing from 50 to about 80 mole percent of isoprene units to produce an essentially gel-free copolymer having a Mooney viscosity ML 1+4(100° C.) below about 20 and (2) blending the masticated copolymer with a high molecular weight polymer of butadiene-1,3 said polymer being present in the 1:1 to 5:1 proportion to the masticated copolymer on a weight basis.

In another of the specific aspects, this invention provides a rubbery composition which comprises a vulcanizate of a copolymer of isoprene and acrylonitrile containing from 50 to about 80 mole percent of isoprene, said copolymer being essentially gel-free and having a Mooney viscosity ML 1+4(100° C.) below about 20.

The elastomeric copolymer which can be used in accordance with the invention is a copolymer of a major proportion of 2-alkyl butadiene-1,3 and a minor proportion of at least one acrylic nitrile. The alkyl substituent in the 2-alkyl butadiene-1,3 may be any alkyl radical containing 1 to 5 carbon atoms such as methyl-, ethyl, isopropyl, butyl, amyl. Representative examples of 2-alkyl butadiene 1,3 are isoprene, 2-ethyl butadiene-1,3, 2-isopropyl butadiene-1,3 and 2-amyl butadiene-1,3. The 2-alkyl butadiene-1,3 may also be substituted at the third carbon atom, as for example in 2,3-dimethyl butadiene-1,3. However, its is preferred to use butadiene-1,3 having one alkyl substitutent with 1 to 2 carbon atoms in the alkyl and best results are obtained with 2-methyl butadiene-1,3 generally known under the name of isoprene.

The acrylic nitrile which is copolymerized with 2-alkyl butadiene-1,3 is an acrylic nitrile having the general formula

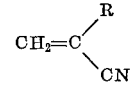

where R is hydrogen, $C_1$ to $C_3$ alkyl radical, halogen or cyanide. Representative examples are acrylonitrile, methacrylonitrile, ethacrylonitrile, chloroacrylonitrile, vinylidene cyanide, although best results are obtained with acrylonitrile. More than one acrylic nitrile may be copolymerized with the 2-alkyl butadiene-1,3 to produce a copolymer containing units of three or more monomers. It is possible to use copolymers in which other copolymerizable monomers such as styrene, vinyl pyridine, esters of acrylic acids with alkyl alcohols are also present in amounts of less than ⅓ of the weight of the acrylic nitrile.

The copolymer which is masticated in accordance with the invention is an elastomer of a high molecular weight, that is, a polymer which when vulcanized produces rubber like material. It consists of polymeric chain molecules containing monomeric units of 2-alkyl butadiene-1,3 and acrylic nitrile in a molar proportion from about 50/50 to about 28/20. The high proportion of the 2-alkyl butadiene-1,3 to acrylic nitrile within the indicated range is preferred, when a soft composition is desired. A lower content of 2-alkyl butadiene-1,3 on the other hand, is preferred when it is desired to produce a composition of high processability and high thermoplasticity and yet vulcanizable to a rubbery product having good stress-strain properties. Best results are obtained with a copolymer containing about 60 to 75 mole percent of 2-alkyl butadiene-1,3 such as isoprene and about 25 to 40 mole percent of an acrylic nitrile such as acrylonitrile. These copolymers are produced by polymerizing in the presence of a free radical type catalyst. Conventional catalysts may be used such as potassium persulfate, benzoyl peroxide, diazothioether, or a Redox system consisting of an organic peroxide and a reducing complex salt of ferrous iron. The latter system is especially effective in aqueous emulsion system at low temperature of about 0° C. to 25° C., while the former catalysts are employed at a temperature above 25° C., and preferably below 70° C.

It is customary in the rubber industry to express the molecular weight of rubbery polymers in terms of intrinsic viscosity or Mooney viscosity. The intrinsic viscosity is calculated from the values of the relative viscosity of dilute solutions of polymer in a good solvent e.g. toluene or methyl ethyl ketone, at different polymer concentrations according to the equation $$[\eta] = \lim_{C \to 0} \frac{\log_e \eta r}{C}$$

where $[\eta]$ is the intrinsic viscosity and is equal to a value of the natural logarithm of relative viscosity $\log_e \eta r$ divided by the polymer concentration C of the dilute solution, said value being extrapolated to an infinitely diluted concentration. The Mooney viscosity is determined according to ASTM D 1646–63 procedure using a large rotor and taking a reading after one minute of warm up and four minutes of running at 100° C. which conditions are indicated in the designation ML 1+4 (100° C.).

The average molecular weight of the copolymer which is masticated according to the invention is in the order of about 200,000 and above which corresponds to an intrinsic viscosity of about 2 dl./g. (deciliter/gram) and above and a Mooney viscosity ML 1+4 (100° C.) ranging from about 40 to 150. This high molecular weight copolymer of 2-alkyl butadiene and acrylic nitrile represents a solid mass with a dry touch. In accordance with the invention it is masticated whereby the molecular weight is significantly reduced and essentially no gel is formed. For this purpose, the copolymer may be milled on an open two roll mill or in an internal mixer such as a Banbury mixer, at a temperature between 50° C. and 200° C., preferably between 100° C. and 175° C. The time of mastication may vary from a few minutes to about one hour depending on the composition of the copolymer, temperature and the degree of plasticizing required. The molecular weight of the copolymer decreases relatively fast at the start of mastication and, when the copolymer is plasticized to a level at which it almost flows, further decrease is slow and almost ceases so that prolonging the mastication beyond that point is impractical. If it is desired to reduce the mastication time or to achieve a higher degree of plasticizing, that is, a lower molecular weight, peptizers are added in small amounts of up to 5 percent by weight of the copolymer. It is preferred to use about 2–3 percent of a peptizer, since with that amount the degradation of the molecular weight proceeds rapidly and yet at a controllable rate. Conventional peptizers may be used according to the invention. They include mercaptans, thioacids, hydrazines, chlorinated thiophenols and the specific examples are 2,2′-dibenzamide diphenyl disulfide, pentachlorothiophenol, xylyl mercaptan, furfural-p-bromophenyl-hydrazone, and mixtures thereof.

The molecular weight of the masticated copolymer is estimated to be about 10,000 to 100,000, preferably about 25,000 to 50,000. The masticated copolymer is essentially gel-free and completely soluble in good solvents e.g. methyl ethyl ketone. The intrinsic viscosity, measured at room temperature, in toluene for low nitrile copolymers, and in methyl ethyl ketone for high nitrile (above 30 mole percent) copolymers, ranges from about 0.2 to 1.0. The Mooney viscosity ML 1+4 (100° C.) is below about 20 and preferably ranges from a low value of about 1 to about 18. The masticated polymer is soft, tacky and extremely plastic at temperatures of 50° C. and above and yet, when stored at room temperature it is nearly as solid as the unmasticated high molecular weight copolymer. It may be easily compounded with the conventional compounding ingredients, shaped and when vulcanized in the presence of the usual amount of sulfur, of less than about 5 percent, it produces a rubbery product. High plasticity of the copolymer in the absence of non-polymeric plasticizers and good physical and chemical properties of vulcanized compounds are the qualities required in a polymer suitable for the preparation of rubbery compositions which may be used in the manufacture of various oil resistant goods such as printing blankets, roll covers, pads, hose, packings, couplings, dampers, belts, soles and diaphragms. The masticated copolymer is also suitable for the preparation of oil resistant cellular materials such as open cell and closed cell expanded rubber. The art of producing chemically blown and expanded cellular rubber is well known. Cellular materials prepared from the masticated copolymers in accordance with this invention are useful as shock absorbing, vibration padding, heat and sound insulating materials in application, where oil resistance and physical strength are required.

The masticated copolymer of 2-alkyl butadiene-1,3 and acrylic nitrile having a Mooney viscosity ML 1+4(100° C.) below about 20 is also valuable as a curable processing aid suitable for use with high molecular weight polymers, preferably polymers of butadiene-1,3. For example, milling, calendering and extrusion characteristics of the conventional nitrile rubber is greatly improved by the incorporation of a minor proportion of the isoprene-acrylonitrile copolymer masticated in accordance with the invention to a Mooney viscosity below about 20, preferably about 10. Similar improvement in processability is observed when other polymers of butadiene-1,3 such as polybutadiene and styrenebutadiene rubber are blended with the masticated isoprene-acrylonitrile copolymer in a proportion between 1:1 and 5:1 on a weight basis. The blends are characterized by good physical properties and improved oil resistance of their vulcanizates.

The invention will be described in greater detail by means of experimental results described in the following examples.

EXAMPLE 1

A high molecular weight copolymer of isoprene and acrylonitrile containing 37.5 mole percent of acrylonitrile and having a Mooney viscosity ML 1+4(100° C.) of 75 was milled on a 15 cm. x 30 cm. two roll open mill for 45 minutes in the presence of 2 parts by weight per 100 parts of the copolymer of 2,2′-dibenzamide diphenyl disulphide composition sold under the trademark Pepton 22 by the American Cyanamid Company. The temperature of the rolls was maintained at 150° C. and the rubber stock temperature varied within the range 149 to 176° C. Mooney viscosity ML 1+4(100° C.) of the copolymer was measured in 20 minutes and at the end of the 45 minutes milling period and the following values were noted:

| Milling time (minutes): | Mooney Viscosity ML 1+4(100° C.) |
|---|---|
| 0 | 75 |
| 20 | 12 |
| 45 | 3.5 |

The masticated copolymer was sticky and adhered to the rolls by 20 minutes of milling and partially dripped off the rolls by 40 minutes. A control polymer of butadiene-1,3 containing 34.0 mole percent of acrylonitrile milled under the same conditions was not plasticized appreciably. Its final Mooney viscosity was 43.5.

The masticated copolymer and the unmasticated control copolymer of isoprene and acrylonitrile were each compounded in the following recipe:

| | Parts by weight |
|---|---|
| Copolymer | 100 |
| Precipitated silica[1] | 7.5 |
| Zinc oxide | 5.0 |
| Stearic acid | 1.0 |
| Benzothiaryl disulfide | 1.5 |
| Sulfur | 2.5 |

[1] Available under the trademark Hi Sil 233 from Columbia-Southern Chemical Corporation.

The compounds were tested for processability, then cured at 145° C. and tested for physical properties. The results are presented in Table 1.

TABLE 1

| Copolymer | Masticated | Unmasticated (control) |
|---|---|---|
| Compound Mooney ML 1+4(100° C.) | 3.5 | 48.5 |
| Extrusion rate [1] (gms./15 seconds) | (2) | 18.7 |
| Melt flow index [3] (gms./min.) at— | | |
| 100° C | 2.244 | 0.012 |
| 200° C | (4) | 0.729 |
| Vulcanized 25 mins. at 145° C.: | | |
| Tensile strength (kg./cm.²) | 165 | 303 |
| Elongation (percent) | 710 | 650 |
| 300% modulus (kg./cm.²) | 21.5 | 29.5 |
| Tear strength (kg./cm.) | 21.4 | 31.2 |
| Hardness (Shore A-2) | 39 | 48 |

[1] Extrusion through a 3.2 mm circular die using the Royle Extruder Model ½, worm speed 68 r.p.m. at 150° C.
[2] Too fluid to measure.
[3] Represents the weight of polymer forced through an orifice of diameter 2.1 mm. under a force of 10 kg.
[4] Too fluid to handle.

The above data show that the masticated copolymer having a high plasticity and showing at 100° C. a flow rate about 180 times higher than the unmasticated copolymer vulcanizes to a soft rubbery state characterized by satisfactory physical properties.

EXAMPLE II

The masticated isoprene/acrylonitrile copolymer of Example I was compounded in a carbon black loaded formulation vulcanized and tested as previously described. The compounding formulation was:

| | Parts by weight |
|---|---|
| Copolymer | 100 |
| High abrasion furnace black | 40 |
| Zinc oxide | 3 |
| Stearic acid | 0.5 |
| Benzothiazyl disulphide | 1.0 |
| Sulphur | 1.5 |

The test values noted in Table II show that the masticated copolymer having a Mooney viscosity of 3.5 ML 1+4(100° C.), is readily extrudable and when vulcanized, produces a rubber of satisfactory physical properties.

TABLE II

Extrusion rate at 150° C.

| | |
|---|---|
| (Grams/15 seconds) | 28.2 |
| (Centimeters/15 seconds) | 224 |

Physical properties of cured stock (cured at 145° C. for 50 mins.)

| | |
|---|---|
| Tensile strength (kg./cm.²) | 220 |
| Elongation at break (percent) | 490 |
| Modulus at 300% elongation (kg./cm.²) | 129 |
| Hardness (Shore A-2) | 60 |

EXAMPLE III

The high molecular weight isoprene/acrylonitrile copolymer of Example I was masticated with and without the addition of peptizers on a two-roll mill at the temperatures as indicated in Table III and the Mooney viscosity was measured at intervals of 10, 20 and 45 minutes. The results are presented in Table III.

TABLE III

| | Sample | | | | |
|---|---|---|---|---|---|
| | 1 | 2 | 3 | 4 | 5 |
| Peptizer | [1]A | [2]B | [2]B | Nil | Nil |
| Parts/100 parts copolymer | 4 | 4 | 2 | 0 | 0 |
| Approx. temp. of milled stock (° C.) | 150 | 150 | 70 | 70 | 150 |
| Mooney viscosity ML 1+4(100° C.), milling time (minutes): | | | | | |
| 10 | 7 | 18 | 49 | 56 | 56 |
| 20 | 6 | 8 | 38 | 46 | 41 |
| 45 | 5 | 15 | 16 | 29 | 17 |

[1] pentachlorothiophenol.
[2] 2,2'-dibenzamide diphenyl disulfide.

The data in Table III indicate that the high molecular weight isoprene-acrylonitrile copolymer is easily plasticized, by milling at 150° C. in the presence of and in the absence of peptizers. Cold milling at 70° C., with mill rolls water cooled at about 20° C., was also effective in reducing the Mooney viscosity. Masticated samples 1 and 2 were relatively fluid at 150° C.; samples 3 and 5 were in the form of a viscous fluid mass at the end of milling; and sample 5 was quite tacky. On cooling to room temperature, all samples became firm with little tack.

EXAMPLE IV

Two portions of the isoprene/acrylonitrile copolymer of Example I were separately plasticized by milling at about 150° C. in the presence of 2 parts per 100 parts of the copolymer of 2,2'-dibenzamide diphenyl disulfide to produce masticated samples having Mooney viscosity as follows:

Sample A _____ 18 ML 1+4 (100° C.)
Sample B _____ 3 ML 1+4 (100° C.)

These samples A and B were each blended with an easy processing butadiene-acrylonitrile copolymer containing 34 mole percent of acrylonitrile and having a Mooney viscosity ML 1+4 (100° C.) of 52 in amounts indicated in Table IV and compounded using the following formulation which is a formulation used for the preparation of oil seals and gaskets.

| | Parts by weight |
|---|---|
| Polymer | 100 |
| Fast extruding furnace black | 50 |
| Medium thermal black | 50 |
| Triglycol dioctylate | 10 |
| Sulphur | 0.125 |
| Zinc oxide | 5 |
| Stearic acid | 1 |
| Polymerized trimethyldihydroquinoline | 2 |
| N-cyclohexyl-2-benzothiazole sulphenamide | 2.5 |
| Tetramethyl thiuram disulphide | 2.5 |

The compounding of all but the last two components was performed in a Banbury mixer adjusted to a temperature of 95° C. A seven minute mixing cycle was used and then the stock was dumped to cool before the addition on a cool open-roll mill of the accelerators, that is, the last two components of the formulation.

Extrusion tests of the compounded stocks were made with a Royle extruder at 105° C. using 3.2 millimeter die. Physical properties were tested on specimens which were cured at 166° C. for 40 minutes and the resistance to 70 hour ageing at 100° C. both in ASTM oil #3 and in air was tested on specimens cured for 10 minutes. The butadiene-acrylonitrile copolymer was used as a control. The results are presented in Table IV.

TABLE IV

| | Compound | | | |
|---|---|---|---|---|
| | Control | 1 | 2 | 3 |
| Blend composition: | | | | |
| Bd-ACN content (percent by wt.) | 100 | 90 | 60 | 60 |
| Isoprene-ACN content (percent by wt.) | 0 | 10 | 40 | 40 |
| Mooney viscosity of isopropyl-ACN ML 1+4 (100° C.) | | 3 | 3 | 18 |
| Compound Mooney ML 1+4 (100° C.) | 52 | 52 | 37 | 47 |
| Processability of uncured stock: | | | | |
| Mill shrinkage, percent | 19 | 17 | 10 | 17 |
| Extrusion rate: | | | | |
| (centimeters/15 seconds) | 188 | 228 | 288 | 252 |
| (grams/15 seconds) | 27.0 | 30.0 | 34.0 | 31.0 |
| Percent swell | 37 | 27 | 9 | 14 |
| Physical properties of cured stock: | | | | |
| Tensile strength (kg./cm.²) | 131 | 136 | 124 | 138 |
| Elongation at break (percent) | 340 | 330 | 330 | 360 |
| 300% modulus (kg./cm.²) | 126 | 132 | 117 | 129 |
| Tear strength (kg./cm.) | 48.2 | 50 | 48.2 | 50 |
| Ageing at 100° C. for 70 hours in air: | | | | |
| Tensile strength (percent change) | +15 | +22 | +16 | +15 |
| Elongation (percent change) | −27 | −26 | −29 | −24 |
| 100% modulus (percent change) | +72 | +67 | +82 | +75 |
| ASTM oil #3 ageing (70 hours at 100° C.): | | | | |
| Tensile strength (percent change) | −2 | +5 | +1 | −6 |
| Elongation (percent change) | −11 | −15 | −11 | −21 |
| 100% modulus (percent change) | +7 | +10 | +4 | +8 |
| Volume swell in ASTM oil #3 (percent) | 14 | 10 | 9 | 9 |

Table IV shows that the copolymer of isoprene/acrylonitrile plasticized by milling improves the extrusion rates of conventional butadiene-acrylonitrile without detracting from the physical properties of the cured stock.

EXAMPLE V

Two samples of a high molecular weight isoprene/acrylonitrile copolymer containing respectively 22 and 43 mole percent of acrylonitrile were milled on a 15 x 30 cm. mill at a temperature of about 150° C. Samples were taken after periods of respectively 20 and 45 minutes of milling and Mooney viscosity and intrinsic viscosity were determined. The results are shown in Table V.

TABLE V

|  | Sample | |
|---|---|---|
|  | 1 | 2 |
| ACN content (mole percent) | 22 | 43 |
| Peptizer | Nil | [1] 2 |
| Viscosity | [2] ML 1+4   [3] [η] | [2] ML 1+4   [4] [η] |
| Time of milling (mins.): | | |
| 0 | 87       2.06 | 58        [5] |
| 20 | 27.5    1.28 | 14        [5] |
| 45 | 2.5      0.59 | 12       0.5 |

[1] Pentachlorothiophenol parts.
[2] 100° C.
[3] Determined in toluene at 30° C. (deciliter/gram).
[4] Determined in methyl ethyl ketone at 30° C.
[5] Not tested.

Samples 1 and 2 were next compounded using the following recipe:

| | Parts by weight |
|---|---|
| Copolymer | 100 |
| Precipitated silica [1] | 7.5 |
| Di-tert.-amyl hydroquinone | 1.0 |
| Zinc oxide | 3.0 |
| Benzothiazyl disulfide | 1.0 |
| Sulfur | 2.5 |

[1] Sold under the trademark Hi Sil 233 by Columbia-Southern Chemical Corporation.

The compounds were cured at 145° C. for 100 minutes and then tested for stress-strain properties. The results are shown in Table VI.

TABLE VI

| | Sample 1 | Sample 2 |
|---|---|---|
| Tensile strength (kg./cm.$^2$) | 36.6 | 226 |
| Elongation at break (percent) | 1,000 | 420 |
| 300% modulus (kg./cm.$^2$) | 7.0 | 114 |

The above data indicate that the copolymer containing lower acrylonitrile content readily plasticizes to a product which cures to a soft vulcanizate. The 43 mole percent acrylonitrile copolymer plasticizes at a slower rate, but produces a vulcanizate of high strength.

EXAMPLE VI

An isoprene acrylonitrile copolymer containing 36.6 mole percent of acrylonitrile and having a Mooney viscosity reduced by milling to 8 ML 1+4 (100° C.) was used as a processing aid for two polymers of butadiene-1,3, a cis-1,4 polybutadiene having a Mooney viscosity of 45 ML 1+4 (100° C.) and a styrene-butadiene rubber (SBR) having a Mooney viscosity of 52. Three compounds were prepared using the cis-1,4 polybutadiene blended with the isoprene-acrylonitrile copolymer in proportions 100/0, 80/20 and 60/40. The first compound was a control. Two additional compounds were made with SBR, one of which was blended with the low Mooney isoprene-acrylonitrile copolymer in a proportion of 60/40, the other which was free of the low Mooney copolymer served as a second control. The compounding recipe was as follows:

| | Parts by weight |
|---|---|
| Total polymer | 100 |
| High abrasion furnace black | 50 |
| Stearic acid | 1.0 |
| Zinc oxide | 3.0 |
| Benzothiaryl disulfide | [1] 1.25 |
| Sulfur | [1] 1.75 |

[1] Except for compounds 4 and 5 in which the amounts were 1.5 and 2.0, respectively.

TABLE VII

| | Compound | | | | |
|---|---|---|---|---|---|
| | 1 [a] | 2 | 3 | 4 [a] | 5 |
| Blend composition (parts by weight): | | | | | |
| Cis-1,4 polybutadiene | 100 | 80 | 60 | | |
| SBR | | | | 100 | 60 |
| Isoprene-acrylonitrile | | 20 | 40 | | 40 |
| Processability of uncured stock: | | | | | |
| Compound Mooney ML 1+4 (100° C.) | 71.5 | 67.5 | 59 | 77.5 | 66.0 |
| Mill shrinkage (percent) | 50 | 34 | 28.3 | 35.3 | 15.0 |
| Extrusion at 104° C. 3.2 mm. die: | | | | | |
| Rate: | | | | | |
| Gms./15 seconds | 12.2 | 13.1 | 14.8 | 19.5 | 21.8 |
| Cms./15 seconds | 55.2 | 64.4 | 75.9 | 118 | 135 |
| Ratio (gms./cm.) | 0.221 | 0.203 | .195 | 0.166 | 0.162 |
| Cured at 145° C. for 50 minutes: | | | | | |
| Tensile strength (kg./cm.$^2$) | 94.2 | 140 | 131 | 259 | 237 |
| Elongation at break (percent) | 410 | 390 | 290 | 535 | 340 |
| 100% modulus (kg./cm.$^2$) | 14.7 | 25.4 | 42.9 | 21.4 | 61.9 |
| Tear strength (kg./cm.) [b] | 20.5 | 42.9 | 37.5 | 54.5 | 42 |
| Compression set [c] | 36.4 | 19.1 | 22.8 | 31.7 | 14.7 |
| Aged properties (70 hrs. at 100° C. in air), change from original values: | | | | | |
| Tensile strength (percent) | +12 | −1 | +11 | +16 | −8 |
| Elongation (percent) | −56 | −54 | −41 | −57 | −41 |
| 100% modulus (percent) | +343 | 247 | +192 | +285 | +170 |
| Volume change (70 hours at 100° C.) in— | | | | | |
| ASTM oil #1 (percent) | 112 | 60 | 38 | 51 | 21 |
| ASTM oil #3 (percent) | 285 | 189 | 120 | 176 | 75 |

[a] Control.
[b] ASTM D-624 procedure using Die C.
[c] Specimen compressed to 35% deflection, maintained at 70° C. for 22 hours, relaxed for ½ hour at room temperature before the measurement was made.

The data in Table VII indicate that the processability indices such as compound Mooney viscosity, mill shrinkage, and extrusion rate all are improved, when the low Mooney copolymer of isoprene and acrylonitrile was added in proportions of 20 and 40 parts respectively, per 100 parts of the total polymer. The physical properties of cured stocks were not adversely affected while the resistance to hot air ageing and to oil was greatly increased.

EXAMPLE VII

This example describes the preparation of two expanded cellular rubbers from the masticated isoprene-acrylonitrile copolymer of Example VI.

This polymer was compounded on an open two-roll mill using the following recipes:

| | Low density recipe | High density recipe |
|---|---|---|
| Masticated copolymer | 100 | 100 |
| Precipitated silica [1] | 7.5 | 10 |
| Calcium silicate [2] | | 40 |
| Titanium dioxide | | 10 |
| Zinc oxide | 3 | 5 |
| Stearic acid | 1 | |
| Oleic acid | | 5.0 |
| Benzothiazyl disulphide | 1.5 | 2.0 |
| Sulphur | 2.5 | 1.5 |
| Antioxidant | [3] 1.0 | [4] 1.5 |
| Ammonium bicarbonate | 10 | |
| Sodium bicarbonate | | 10 |

[1] Available under the trade name Hi Sil 233.
[2] Available under the trade name Silene EF.
[3] Ditertiary amyl hydroquinone.
[4] Octylated diphenyl amines.

Each compound was cured for 30 minutes at 145° C. in a mould large enough to permit expansion to form a closed cell expanded structure. Physical tests were performed on the cured specimens and the results are shown in Table VIII. The percent rebound was determined at 25° C. by dropping a steel ball (1.11 cm. diameter) from a height of 100 cms. onto a test pad of expanded rubber of 1.27 cm. thickness, and noting the height of rebound. To determine the load for 25 percent compression, a pellet of expanded rubber of 2.86 cm. diameter and 1.27 cm. thickness was compressed 25 percent at a rate of 1.27 cm. per minute and the load required was noted.

TABLE VIII

|  | Low density expanded rubber | High density expanded rubber |
|---|---|---|
| Specific gravity (gms./cm.³) | 0.37 | 0.69 |
| Expansion (percent) | 288 | 81 |
| Rebound at 25° C. (percent) | 1 | 1 |
| Load for 25% compression (kg./cm.²) | 0.3 | 3.5 |
| Modulus at 300% elongation (kg./cm.²) | 5.5 | 7.2 |
| Elongation at break, percent | 427 | 750 |
| Tensile strength (kg./cm.²) | 7.0 | 12.5 |

The low rebound of 1 percent at different load bearing capacity and satisfactory stress-strain properties indicate that the above compositions are suitable for use as shock absorbing and vibration dampening materials.

What is claimed is:

1. A process of preparing a tacky and plastic composition vulcanizable to an oil resistant soft rubber vulcanizate, which process comprises masticating at a temperature of 50 to 200° C. a high molecular weight elastomeric copolymer of from 50 to 80 mole percent of a 2-alkyl butadiene-1,3 in which the alkyl group is of 1 to 5 carbon atoms and from 50 to 20 mole percent of an acrylic nitrile, said elastomer copolymer having a Mooney viscosity (ML 1+4 at 100° C.) of from 40 to 150, to produce an essentially gel-free copolymer having a Mooney viscosity (ML 1+4 at 100° C.) below about 20, said gel-free copolymer being tacky and plastic at a temperature of at least 50° C.

2. A process of preparing a soft rubber vulcanizate comprising the steps of:
   (a) masticating at a temperature of 50 to 200° C. a copolymer comprising monomeric units of 2-alkyl butadiene-1,3 in which the alkyl group is of 1 to 5 carbon atoms and an acrylic nitrile in a molar proportion of from about 50/50 to about 80/20 and having a Mooney viscosity (ML 1+4 at 100° C.) of from about 40 to 150, for a period of less than about one hour at a temperature of 50 to 200° C., whereby there is obtained a plasticized essentially gel-free nitrile copolymer having a Mooney viscosity (ML 1+4 at 100° C.) of less than 20 yet being solid at room temperature;
   (b) vulcanizing said plasticized nitrile copolymer with less than about 5 parts by weight of sulfur to produce said soft rubber vulcanizate.

3. The process of claim 2 wherein said 2-alkyl butadiene is isoprene.

4. The process of claim 3 wherein the acrylic nitrile is at least one of acrylonitrile and methacrylonitrile.

5. The process of claim 4 wherein said copolymer is a copolymer of 60 to 75 mole percent isoprene.

6. The process of claim 4 wherein the mastication of step (a) is performed at a temperature of from 100° to 175° C.

7. The process of claim 4 wherein the plasticized copolymer has a Mooney viscosity (ML 1+4 at 100° C.) of about 10.

8. The process of claim 2 wherein before vulcanization, said plasticized copolymer is blended with a high molecular weight nitrile copolymer of butadiene-1,3 in the proportion of 1:1 to 1:5 on a weight basis.

9. The process of claim 1 wherein a gel-free copolymer is produced having a Mooney viscosity of from 1 to about 10.

References Cited

UNITED STATES PATENTS 3,238,187  3/1966  Kraus et al. .......... 260—94.7

SAMUEL H. BLECH, Primary Examiner

U.S. Cl. X.R.

260—2.5 P, 23.7 M, 32.8 A, 33.6 A, 41.5 A, 41.5 R, 80.7, 83.3

PO-1050
(5/69)

UNITED STATES PATENT OFFICE
CERTIFICATE OF CORRECTION

Patent No. 3,629,373          Dated December 21, 1971

Inventor(s) William H. Embree

It is certified that error appears in the above-identified patent and that said Letters Patent are hereby corrected as shown below:

Please enter the claim for priority on the face of the patent, such being claimed in the original oath and the document being submitted on October 7, 1966:

Priority:   CANADA Application No. 944,619
                   Dated November 5, 1965

Column 2, line 50, "28/20" should read --80/20--

Column 6, line 60, in Table IV, "isopropyl-ACN" should read --isoprene-ACN--

Column 8, line 20, last column for Compound Mooney, "66.0" should be --65.0--

Column 8, line 20, last column for Mill Shrinkage, "15.0" should be --25.0--

Column 8, line 28, after "Compression set" insert --c--

Column 8, line 30, second last column for Tensile Strength, "+16" should be "-16"

Signed and sealed this 4th day of July 1972.

(SEAL)
Attest:

EDWARD M. FLETCHER, JR.
Attesting Officer

ROBERT GOTTSCHALK
Commissioner of Patents